US011297635B2

(12) United States Patent
Salim et al.

(10) Patent No.: US 11,297,635 B2
(45) Date of Patent: Apr. 5, 2022

(54) SLOT BUNDLING

(71) Applicant: JRD COMMUNICATION (SHENZHEN) LTD, Guangdong (CN)

(72) Inventors: Umer Salim, Guangdong (CN); Bruno Jechoux, Guangdong (CN); Sebastian Wagner, Guangdong (CN)

(73) Assignee: JRD COMMUNICATION (SHENZHEN) LTD, Guangdong (CN)

( * ) Notice: Subject to any disclaimer, the term of this patent is extended or adjusted under 35 U.S.C. 154(b) by 101 days.

(21) Appl. No.: 16/621,679

(22) PCT Filed: Jul. 6, 2018

(86) PCT No.: PCT/CN2018/094875
§ 371 (c)(1),
(2) Date: Dec. 11, 2019

(87) PCT Pub. No.: WO2019/029305
PCT Pub. Date: Feb. 14, 2019

(65) Prior Publication Data
US 2021/0289522 A1 Sep. 16, 2021

(30) Foreign Application Priority Data
Aug. 11, 2017 (GB) ..................... 1712909

(51) Int. Cl.
*H04W 72/12* (2009.01)
*H04L 1/18* (2006.01)
(Continued)

(52) U.S. Cl.
CPC ....... *H04W 72/1263* (2013.01); *H04L 1/1896* (2013.01); *H04W 72/0446* (2013.01);
(Continued)

(58) Field of Classification Search
CPC ......... H04W 72/1263; H04W 72/1289; H04W 72/0453; H04W 72/0446; H04L 1/1896; H04L 5/0007
See application file for complete search history.

(56) References Cited

U.S. PATENT DOCUMENTS

2011/0200015 A1\* 8/2011 Bharadwaj ............ H04L 1/0028
370/335
2012/0069796 A1 3/2012 Casaccia et al.
(Continued)

FOREIGN PATENT DOCUMENTS

| CN | 106793127 A | 5/2017 |
| CN | 106788943 B | 5/2020 |

(Continued)

OTHER PUBLICATIONS

"Study on New Radio (NR) Access Technology", 3GPP TR 38.912 V1.0.0 (Mar. 2017), 3rd Generation Partnership Project; Technical Specification Group Radio Access Network; (Release 14).
(Continued)

*Primary Examiner* — Jael M Ulysse
(74) *Attorney, Agent, or Firm* — BakerHostetler

(57) ABSTRACT

Systems and methods to bundle mini-slots in an OFDM based wireless communication system. Mini-slots are bundled to improve the probability of successful reception by Permitting repeated transmission of a given transport block of data. Mini-slots which are contiguous or non-contiguous in time and/or frequency may be bundled, and mini-slots from different slots may also be bundled.

17 Claims, 10 Drawing Sheets

(51) Int. Cl.
*H04W 72/04* (2009.01)
*H04L 5/00* (2006.01)

(52) U.S. Cl.
CPC ... *H04W 72/0453* (2013.01); *H04W 72/1289* (2013.01); *H04L 5/0007* (2013.01)

(56) References Cited

U.S. PATENT DOCUMENTS

| | | | |
|---|---|---|---|
| 2014/0003374 A1 | 1/2014 | Kuo | |
| 2014/0233527 A1* | 8/2014 | Gehring | H04J 3/06 370/330 |
| 2016/0211949 A1* | 7/2016 | You | H04L 1/1861 |
| 2017/0164213 A1 | 6/2017 | Lim et al. | |
| 2017/0223670 A1* | 8/2017 | Chen | H04L 5/0048 |
| 2018/0063865 A1* | 3/2018 | Islam | H04W 76/27 |
| 2018/0123765 A1* | 5/2018 | Cao | H04L 1/1671 |
| 2018/0167164 A1* | 6/2018 | Lin | H04L 1/00 |
| 2018/0176945 A1* | 6/2018 | Cao | H04W 72/14 |
| 2018/0219649 A1* | 8/2018 | Ying | H04L 1/1819 |
| 2018/0242315 A1* | 8/2018 | Sun | H04L 1/1887 |
| 2018/0279327 A1* | 9/2018 | Ying | H04W 72/0446 |
| 2018/0317225 A1* | 11/2018 | Akkarakaran | H04L 5/0048 |
| 2018/0368110 A1* | 12/2018 | Ying | H04L 1/0041 |

FOREIGN PATENT DOCUMENTS

| | | |
|---|---|---|
| WO | 2010/139842 A1 | 12/2010 |
| WO | 2015/042431 A1 | 3/2015 |

OTHER PUBLICATIONS

"Technical Specification Group Radio Access Network; Study on New Radio (NR) Access Technology", 3GPP TR 38.912 V1.0.0 (Mar. 2017), 3rd Generation Partnership Project; (Release 14). (revised with marks).

"Presentation of Specification/Report to TSG",TR 38.912, Version 1.0.0, 3GPP TSG RAN Meeting #75, Tdoc RP-170854.

"On UL data transmission procedure", 3GPP TSG RAN WG1 Meeting 91, R1-1719796.

"Summary of remaining issues on UL data transmission procedure", 3GPP TSG RAN WG1 Meeting #92, R1-1801786.

"Uplink URLLC Transmission without Grant", 3GPP TSG RAN WG1 NR Ad-Hoc Meeting, R1-1701206.

"Discussion on uplink grant-free transmission", 3GPP TSG RAN WG1 Meeting # 88, R1-1701962.

"On diversity and HARQ support for URLLC", 3GPP TSG RAN WG1 Meeting # 88, R1-1702746.

"On adaptive HARQ for UL URLLC", 3GPP TSG RAN WG1 Meeting # 88bis, R1-1705523.

* cited by examiner

SLOT BUNDLING

CROSS-REFERENCE TO RELATED APPLICATIONS

This application is a National Stage of International patent application PCT/CN2018/094875, filed on Jul. 6, 2018, which claims priority to foreign Great Britain patent application No. GB 1712909.9, filed on Aug. 11, 2017, the disclosures of which are incorporated by reference in their entirety.

TECHNICAL FIELD

The current disclosure relates to bundling of slots in a wireless communication system, and in particular to bundling mini-slots in a cellular communication system.

BACKGROUND

Wireless communication systems, such as the third-generation (3G) of mobile telephone standards and technology are well known. Such 3G standards and technology have been developed by the Third Generation Partnership Project (3GPP). The $3^{rd}$ generation of wireless communications has generally been developed to support macro-cell mobile phone communications. Communication systems and networks have developed towards a broadband and mobile system.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

NR proposes an OFDM transmission format for the wireless link of the system. OFDM systems utilise a number of sub-carriers spaced in frequency, each of which is modulated independently. Demodulation of the set of the sub-carriers allows recovery of the signals. Time slots are defined for the scheduling of transmissions, which each slot comprising a number of OFDM symbols. NR has proposed 7 or 14 OFDM symbols per slot. The sub-carriers, or frequency resources, within each slot may be utilised to carry one or more channel over the link. Also, each slot may contain all uplink, all downlink, or a mixture of directions.

NR also proposes mini-slots (TR 38.912) which may comprise from 1 to (slot-length-1) OFDM symbols to improve scheduling flexibility. Each mini-slot may start at any OFDM symbol within a slot (provided the resources are not pre-allocated to channels, for example PDCCH). Some configurations may be limited to systems over 6 GHz, or to a minimum mini-slot length of 2 OFDM symbols.

5G proposes a range of services to be provided, including Enhanced Mobile Broadband (eMBB) for high data rate transmission, Ultra-Reliable Low Latency Communication (URLLC) for devices requiring low latency and high link reliability, and Massive Machine-Type Communication (mMTC) to support a large number of low-power devices for a long life-time requiring highly energy efficient communication.

TR 38.913 defines latency as "The time it takes to successfully deliver an application layer packet/message from the radio protocol layer 2/3 SDU ingress point to the radio protocol layer 2/3 SDU egress point via the radio interface in both uplink and downlink." For URLLC, the target for user plane latency is 0.5 ms for uplink (UL), and 0.5 ms for downlink (DL).

TR 38.913 defines Reliability as "Reliability can be evaluated by the success probability of transmitting X bytes within a certain delay, which is the time it takes to deliver a small data packet from the radio protocol layer 2/3 SDU ingress point to the radio protocol layer 2/3 SDU egress point of the radio interface, at a certain channel quality (e.g., coverage-edge)." For URLLC, a reliability requirement for one transmission of a packet is defined as $1 \times 10^{-5}$ for 32 bytes with a user plane latency of 1 ms.

The following disclosure particularly addresses the provision of low latency and high reliability services (URLLC type).

The present invention is seeking to solve at least some of the outstanding problems in this domain.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of downlink data transmission from a base station to a UE in a cellular communication system utilising an OFDM modulation format, the method comprising the steps of scheduling transmission of a Transport Block of data in a first mini-slot comprising at least one OFDM symbol defined within a slot of the transmission format; scheduling a repeated transmission of the Transport Block of data in at least one subsequent mini-slot comprising at least one OFDM symbol; transmitting an indication of the scheduling from the base station to the UE; and transmitting the Transport Block as defined by the scheduling from the base station to the UE.

The first and at least one subsequent mini-slots may start at the same time, but utilise different frequency resources.

The first and at least one subsequent mini-slots may start at different times.

The first and at least one subsequent mini-slots may use the same frequency resources, or may use different frequency resources.

The first and at least one subsequent mini-slots may be located in the same slot, or in different slots.

The indication of scheduling may be transmitted in a DCI message on the PDCCH of a slot.

The indication of scheduling may be transmitted in the first mini-slot.

The indication of scheduling may be transmitted in a DCI message on the PDCCH transmitted in the first mini-slot.

The UE may be configured to transmit an ACK signal if a mini-slot is successfully decoded, and wherein the base station does not transmit further scheduled repetitions of that mini-slot after receipt of the ACK.

The UE may be configured to only transmit a NAK signal if a mini-slot has not been successfully decoded after all repetitions of that mini-slot have been received.

There is also provided a method of uplink data transmission from a UE to a base station in a cellular communication system utilising an OFDM based modulation format (either Cyclic-prefix OFDM or Discrete Fourier Transform Spread OFDM), the method comprising the steps of scheduling transmission in accordance with available resources of a Transport Block of data in a first mini-slot comprising at least one OFDM symbol defined within a slot of the transmission format; scheduling a repeated transmission in accordance with available resources of the Transport Block of data in at least one subsequent mini-slot comprising at least one OFDM symbol; and transmitting the Transport Block as defined by the scheduling from the UE to the base station.

The first and at least one subsequent mini-slots may start at the same time, but utilise different frequency resources.

The first and at least one subsequent mini-slots may start at different times.

The first and at least one subsequent mini-slots may use the same frequency resources, or different frequency resources.

The first and at least one subsequent mini-slots may be located in the same slot, or may be located in different slots.

The indication of scheduling is transmitted in a DCI message on the PDCCH of the slot in which at least the first mini-slot is located.

The base station may be configured to transmit an ACK signal if a mini-slot is successfully decoded, and wherein the UE does not transmit further scheduled repetitions of that mini-slot after receipt of the ACK.

The base station may be configured to only transmit a NAK signal if a mini-slot has not been successfully decoded after all repetitions of that mini-slot have been received.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

The following disclosure provides systems and methods to utilise mini-slots in the NR system to improve reliability, while minimising latency and control overhead. Each transport block (TB) may be repeated several times in time and/or frequency. Control overheads are minimised by utilising a single scheduling command (for example in the Downlink Control Information (DCI) of the Physical Downlink Control Channel (PDCCH) to schedule all transmissions of a TB. Many of the configuration parameters relevant for repeated transmissions of the same TB can be configured in a semi-static manner by the physical or higher layer signalling to further reduce control overhead. Such an arrangement may be attractive where regular data arrival is expected by the gNB.

The following description is given in the context of a cellular communication system, comprising land-based network components and remote User Equipment (UE). In particular reference is made to a wireless channel between a base station of the land-based network and the UE. Transmissions from the base station to the UE are in the downlink direction, and transmissions from the UE to the base station are in the uplink direction. The base station may comprise, or be connected to, a gNB which performs network management and control functions.

The repeated transmissions of each TB may be configured statically to minimise signalling, or dynamically and may use consistent or varying resources (frequency and time hopping). Furthermore, the repeated transmissions may use different redundancy versions of the same code blocks to improve the probability of successful decoding.

In order to exemplify the principles of the invention a set of examples will be described below. The principles of scheduling, communications, and repetition are common to all examples and features identified in relation to one example are also applicable to other examples.

Figure 1:
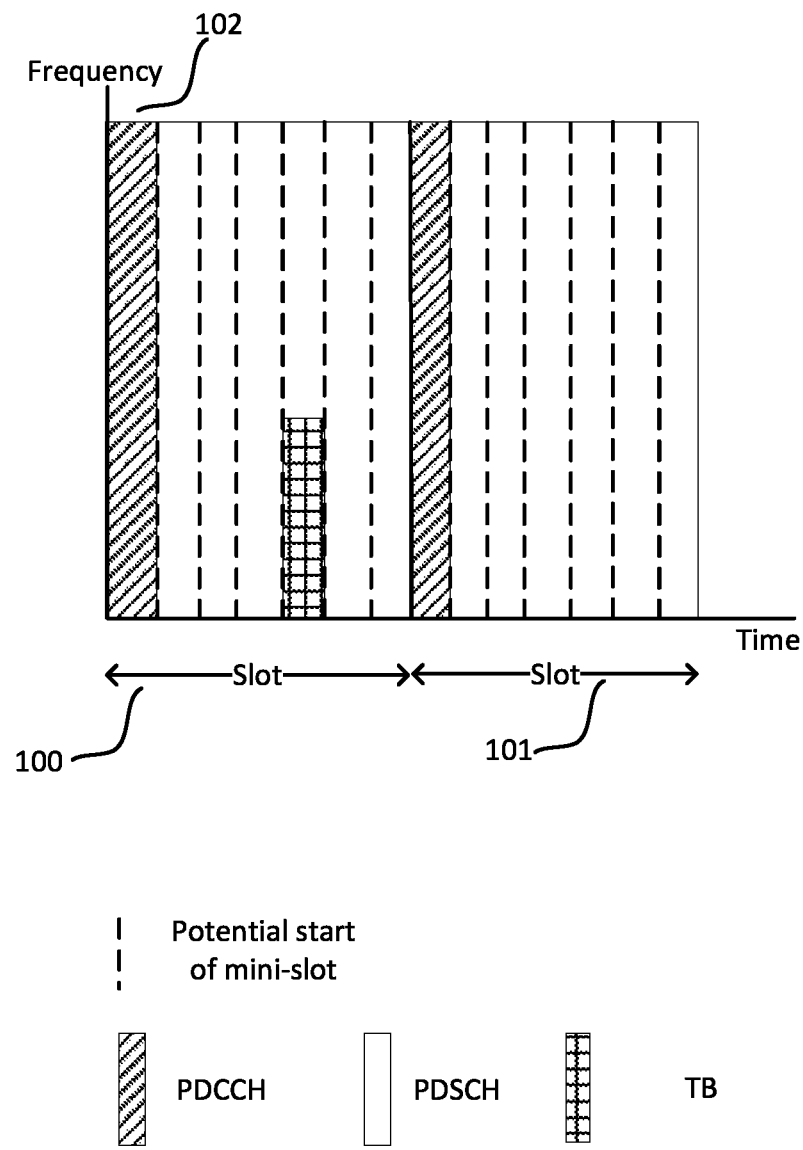
FIG. 1 shows transmission in a mini-slot.

FIG. 1 shows an example of transmitting a TB without any repetition. FIG. 1 shows two slots 100, 101 each comprising 14 OFDM symbols. This figure shows an example mini-slot (TB) which occupies a certain number of frequency resources (sub-carriers) and is 2 symbols long in the example but it can be of any mini-slot length.

In FIG. 1 the DCI transmitted in PDCCH 102 schedules transmission of a TB as indicated. In this example the mini-slot carrying this TB is 2 OFDM symbols long and consumes a portion of the frequency resources (which may be variable to provide the required capacity). However, any length or frequency consumption may be utilised.

Figure 2:
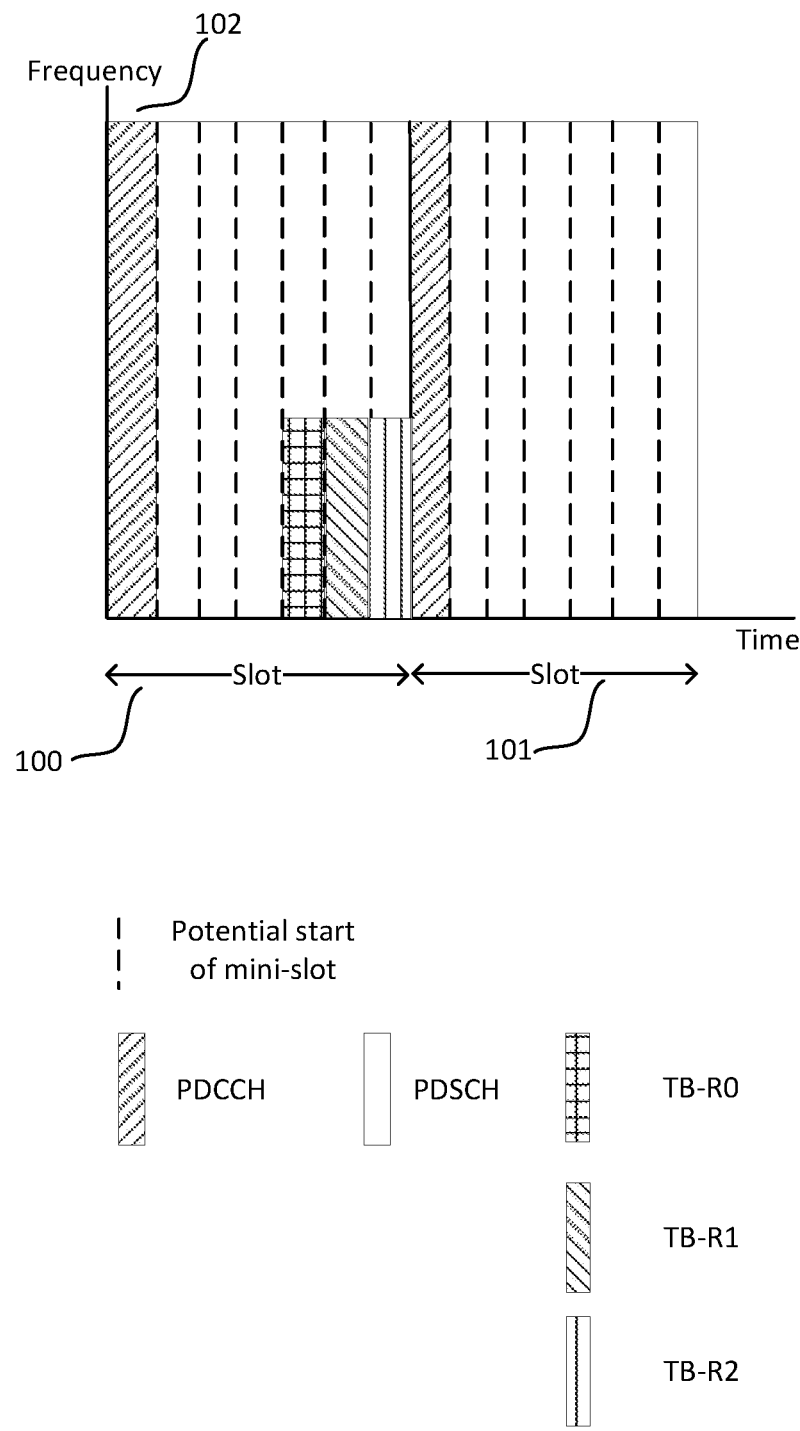
FIG. 2 shows repeated transmissions in contiguous mini-slots in a slot.

FIG. 2 shows an example of the same slot arrangement, but with repetition of a TB. The repetition of the TB is achieved by scheduling multiple mini-slots. The gNB schedules three repetitions of the same TB (R0, R1, R2) to improve the probability of successful decoding. In the same way as FIG. 1 the DCI of the PDCCH at the start of the slot indicates scheduling, and there is no increase in latency as the first transmission is sent at the same point, and further repetitions have been scheduled in the same slot, contiguous to original transmission (or first repetition R0).

The DCI with scheduling information indicating the repetitions is sent in the PDCCH 102 which is transmitted at the start of each slot.

FIG. 2 shows contiguous repetitions using the same frequency resources which may be advantageous where the gNB has prior information that successful detection may be difficult, for example due to a UE being at the cell edge, and that a particular frequency has better performance.

The TB may be repeated directly or different redundancy versions of the original encoded data may be transmitted to lower the code rate to improve the probability of successful detection.

Figure 3:
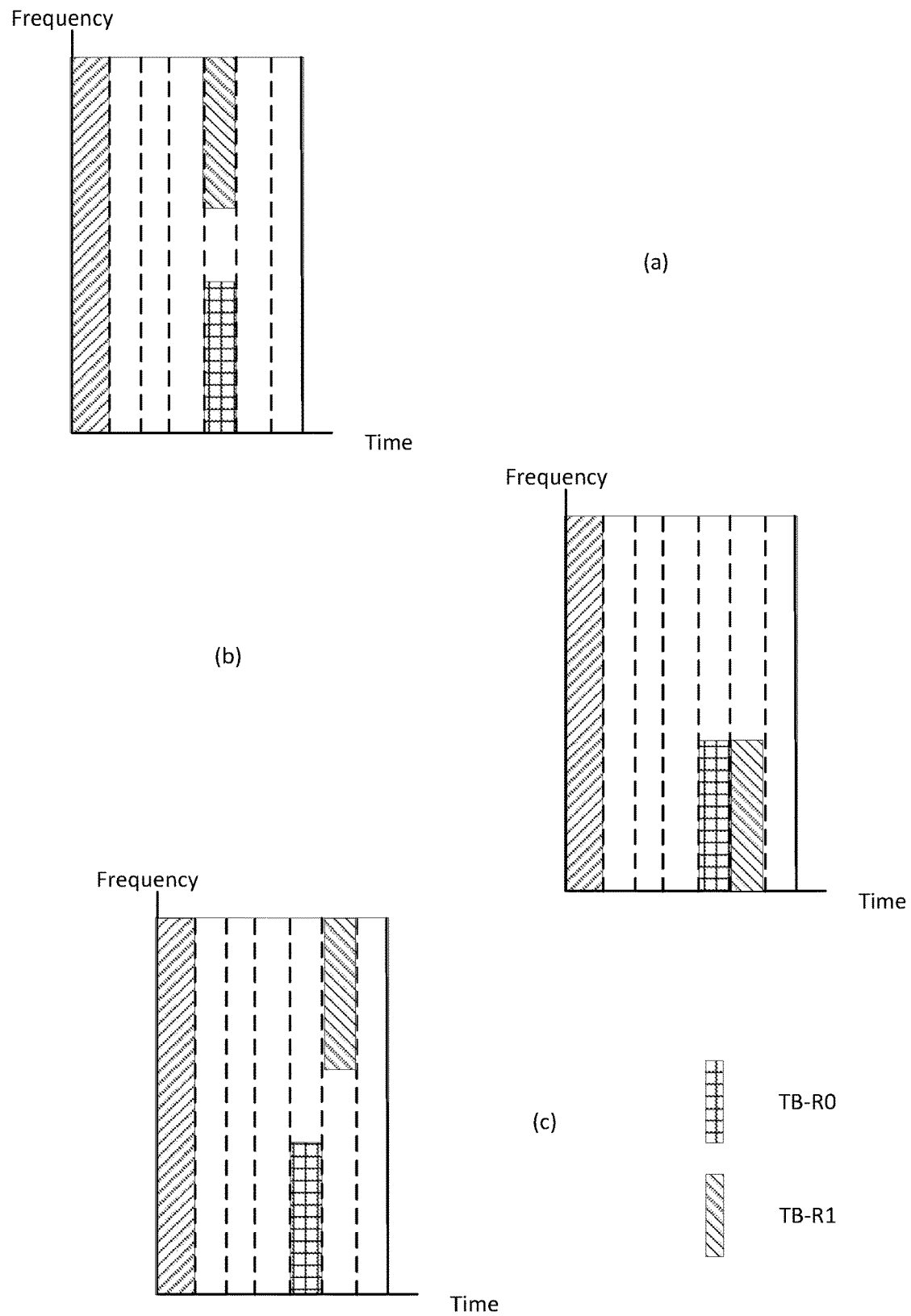
FIG. 3 shows repeated transmissions using different time and frequency resources.

FIG. 3 shows examples of TB repetition to benefit from different forms of diversity. In each example two repetitions of the TB are sent by configuring two mini-slots, which as explained above may be the same or different redundancy versions. In FIG. 3(a) the repetitions are scheduled in the two mini-slots on the same time resource, but using different frequency resources to benefit from frequency diversity in the transmission channel. In FIG. 3(b) the repetitions are in different mini-slots, but at the same frequency (as with the example of FIG. 2) to benefit from time diversity and utilise a frequency with good performance. In FIG. 3(c), different frequency and time resources are utilised to benefit from both time and frequency diversity of the channel. The gNB may select the best form of repetition dynamically based on knowledge of the channel performance, or certain types may be set statically.

FIGS. 2 to 3 have shown repetitions of a TB in the same slot, but repetitions may also be made across multiple slots. Such repetition may impact latency (if subsequent transmissions are required for successful decoding), but gives more freedom to schedule transmissions in the available resources.

Figure 4:
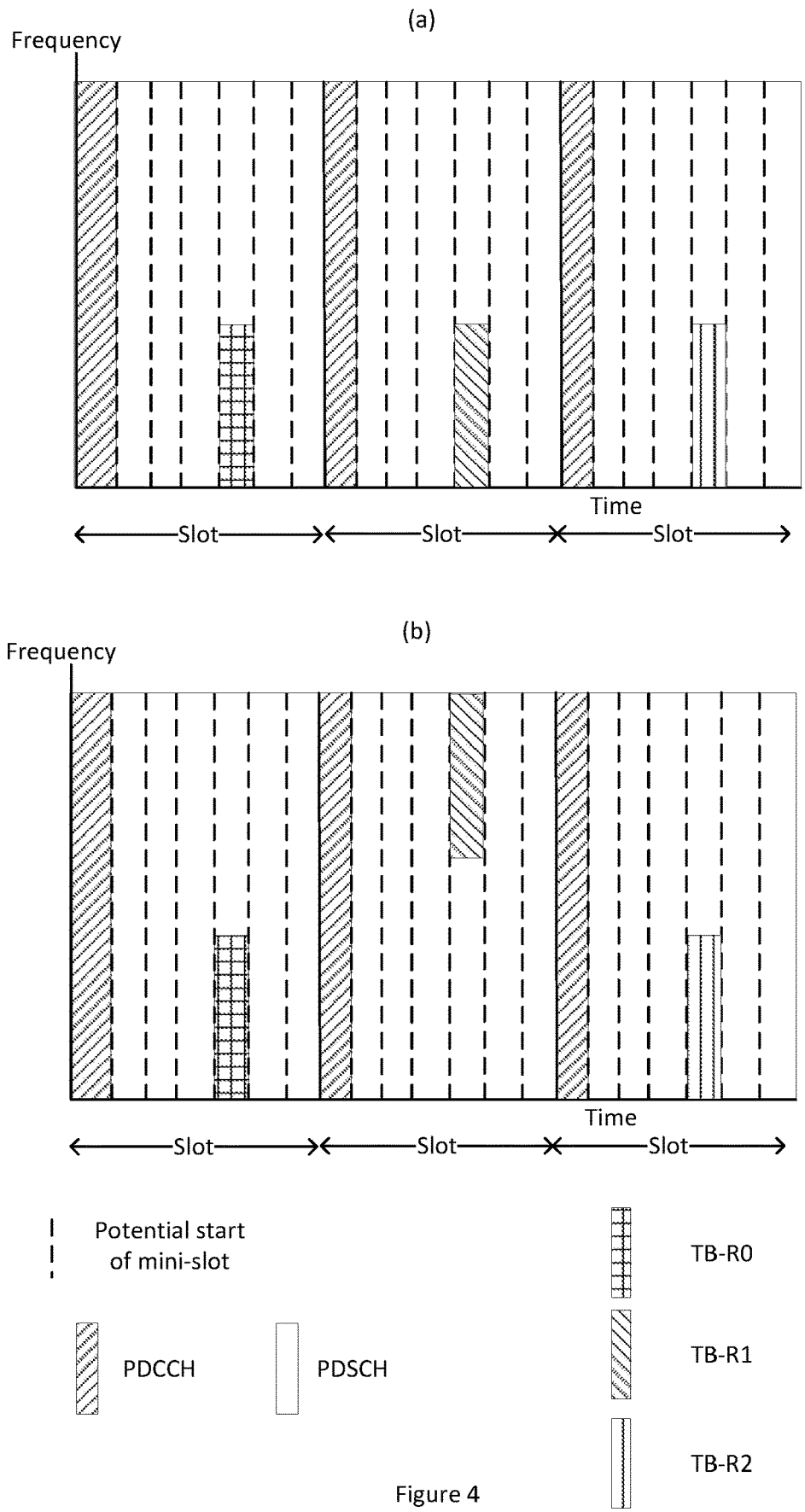
FIG. 4 shows repeated transmissions in different slots.

FIG. 4 shows an example of a series of slots in which a TB is repeated in a number of slots. In FIG. 4(a) each transmission uses the same time and frequency resources in adjacent slots, whereas FIG. 4(b) uses varying frequency resources in each slot. It is also possible to use different time and frequency resources in each slot. The transmissions may be scheduled using DCI in the PDCCH of the first slot which defines resources for all of the repetitions, thus minimising control overhead.

In the above discussion transmission of each mini-slot was scheduled prior to commencement of the mini-slot and the scheduling transmitted in a DCI message on the relevant PDCCH in the control region of the slot. To provide very low latency services NR may allow scheduling of mini-slots after the main scheduling for a slot has been performed, and potentially after the DCI has been transmitted. Where a gNB receives data for transmission from higher layers after scheduling a slot, a delay until the subsequent slot is thus avoided.

Figure 5:
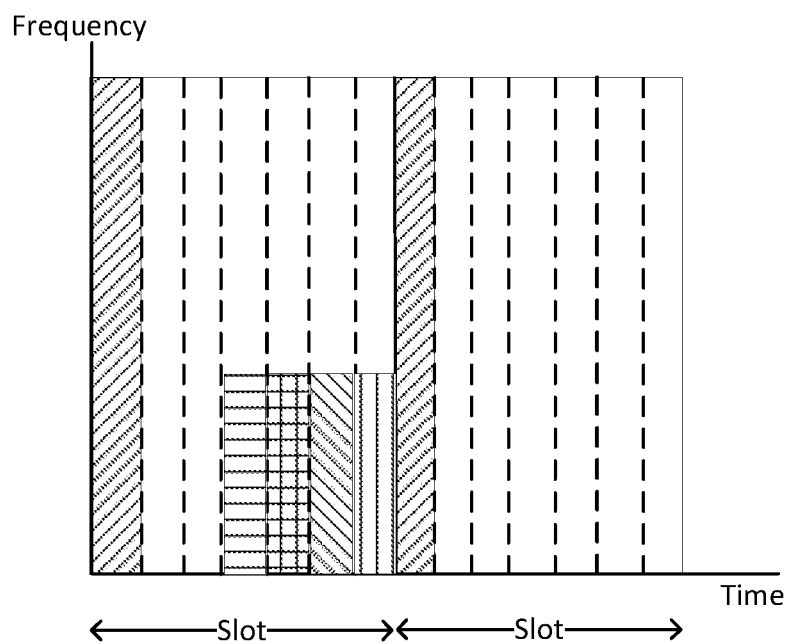
FIG. 5 shows scheduling of mini-slots for URLLC which might contain control information as well as data.
Figure 5:
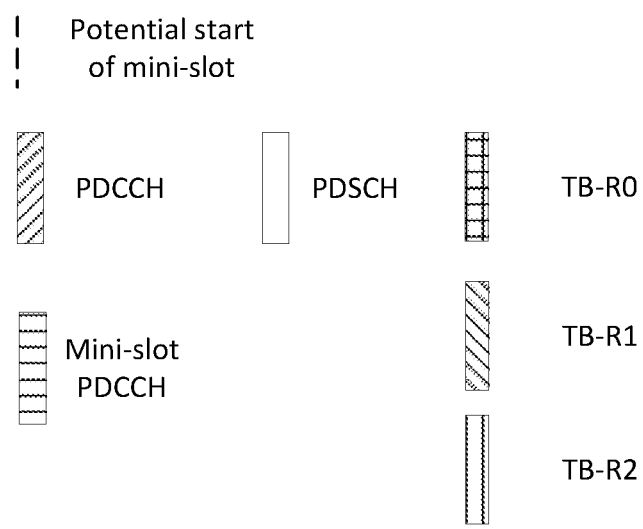

This case will appear for example when in FIG. 5, gNB scheduler receives data after the slot based DCI (PDCCH) has been transmitted. If this data is for latency critical application/service (like URLLC), it can not wait for the next scheduling occasion in the beginning of the next slot. Thus NR allows gNB to schedule this data within the current slot. This is made possible by transmitting a mini-slot which contains its scheduling command (control information) followed by data. Thus these are the mini-slots which consist of both control (command) and data information.

To achieve late scheduling of data for such latency critical service, these mini-slots contain both control and data portions. Such latency critical UE's are configured to listen for DCI within mini-slots during reception of each slot to identify mini-slots that are not as indicated in the DCI for the slot received on main PDCCH for the slot, and adjust their scheduling accordingly.

Preferably, mini-slots with control and data information will be scheduled in unused time/frequency resources, but it is also possible to puncture previously scheduled transmissions with the late-arriving data (and DCI). This puncturing has been standardized in NR under the name "pre-emption".

The DCI transmitted in the mini-slot, or other means, is used to indicate that this replacement has occurred to allow successful reception of the data at the UE. The gNB may also reschedule transmission of the data that was pre-empted by the late arrival of latency critical data.

Figure 6:
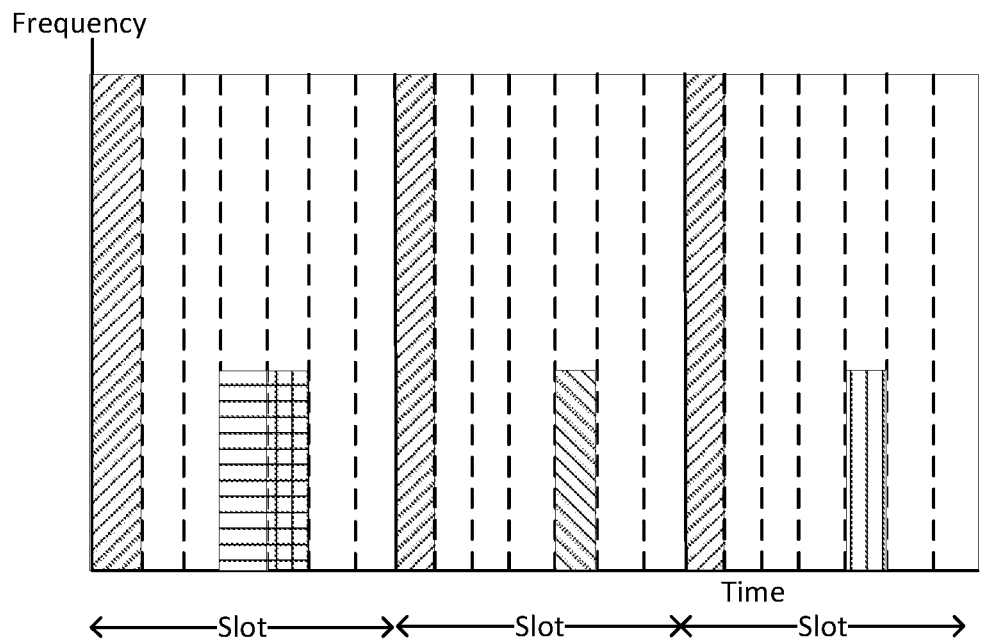
FIG. 6 shows scheduling of mini-slots in different slots for URLLC which might contain control information as well as data.

FIG. 5 shows an example in which URLLC data is received at the gNB scheduler after the slot has been scheduled. Thus the gNB prepares mini-slot DCI which is sent in a second PDCCH in a mini-slot, followed by three repetitions of the TB in subsequent mini-slots as indicated by the DCI. Here mini-slot PDCCH and the first repetition R0 make the first mini-slot and the further repetitions (R1 and R2) are scheduled in the two mini-slots without control information. As explained above, the retransmissions may use the exactly the same coded data or may be different RVs of the encoded data. FIG. 6 shows an example in which the repeated mini-slots are in subsequent slots, not all within the same slot. As for FIG. 5, these three mini-slots are scheduled in the DCI of the first mini-slot. Thus, the first mini-slot contains control (DCI) and data, whereas the last two repetitions of the TB, R1 and R2, make up mini-slots without control information included.

As described for earlier examples, the repetitions may be contiguous or separate in time, and may use the same or different frequency resources to benefit from channel time-frequency diversity.

The above discussion has been focused on the downlink, but comparable considerations are applicable to the uplink direction. UL grant is transmitted to UEs using the DCI on PDCCH, which allows individual or semi-persistent grant of resources. Grant-free UL transmissions are also possible such that UEs can transmit on pre-configured shared or dedicated resources without requiring a specific grant message. NR allows multiple methods to configure grant free UL transmissions, as various combinations of RRC messages with/without L1 signalling.

Figure 7:
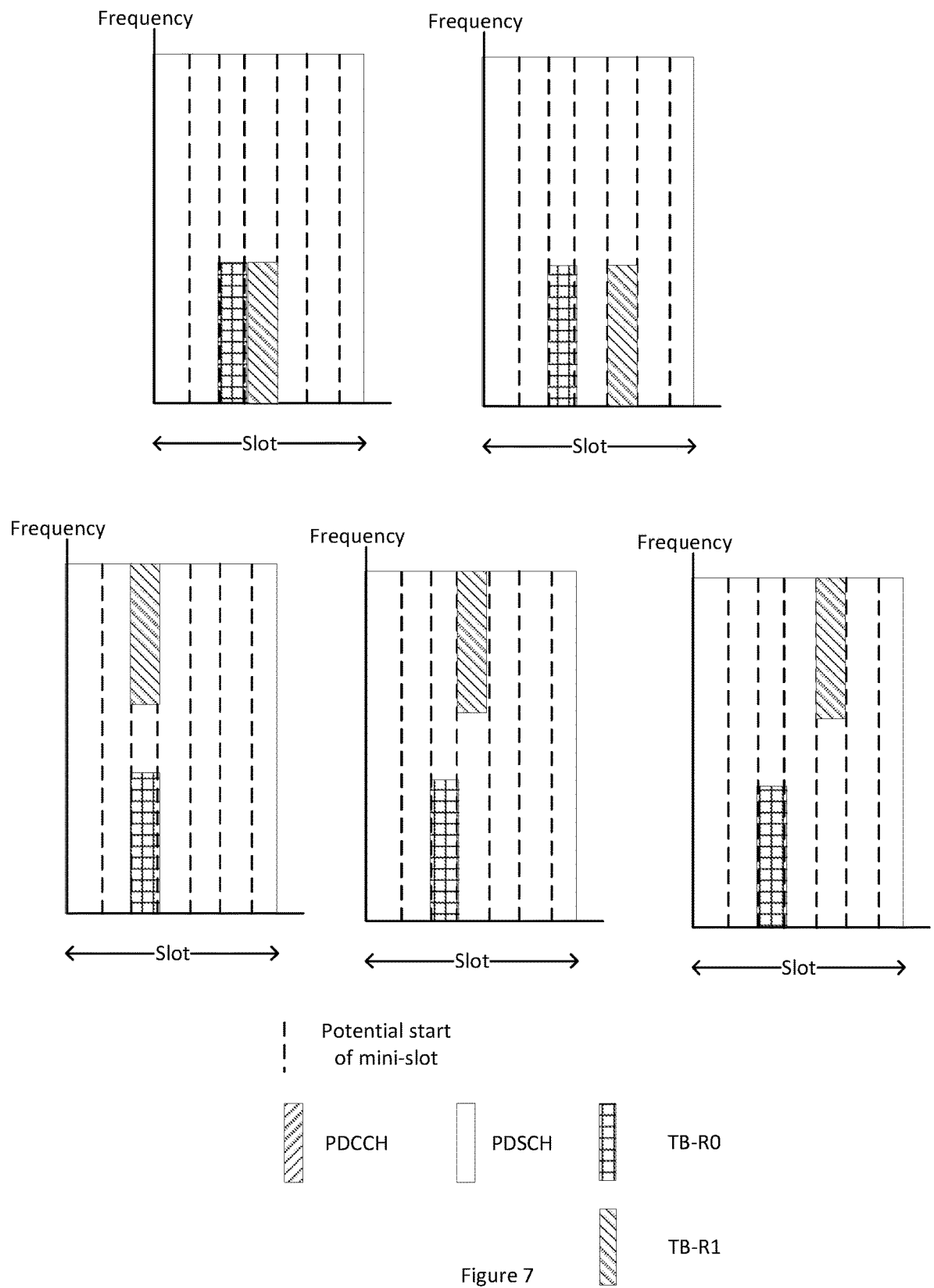
FIG. 7 shows examples of repetition of mini-slots in uplink transmissions in one slot.

FIG. 7 shows various examples in which mini-slots are configured to repeat a transmission once in the same slot as the first transmission. This example shows the case of two mini-slots. As described above, the five options of FIG. 7 show:—
  (a) Contiguous in time without frequency hopping
  (b) Non-Contiguous in time without frequency hopping
  (c) Repetitions on same time and different frequency resources
  (d) Contiguous in time with frequency hopping
  (e) Non-contiguous in time with frequency hopping Each of the mini-slots may be transmitted following UL grant in the DCI, UL Grant Free with repetitions configured, and SPS.

Figure 8A:
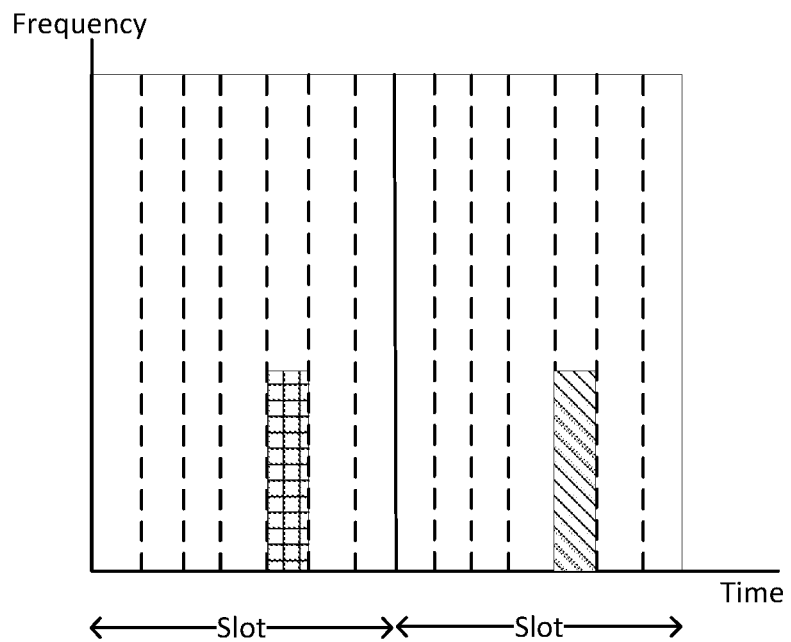
FIG. 8 shows examples of repetition of mini-slots in different slots in an uplink transmission.
Figure 8A:
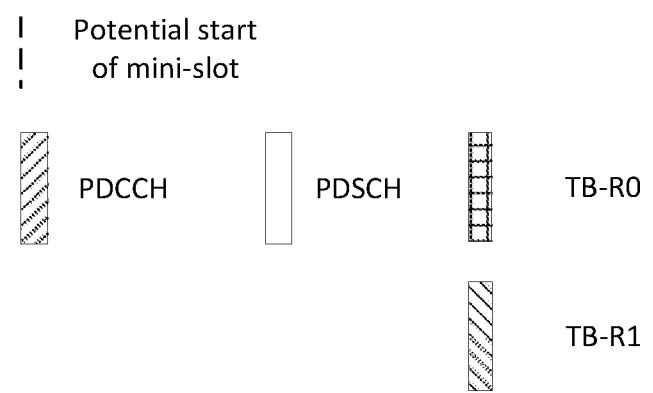
Figure 8B:
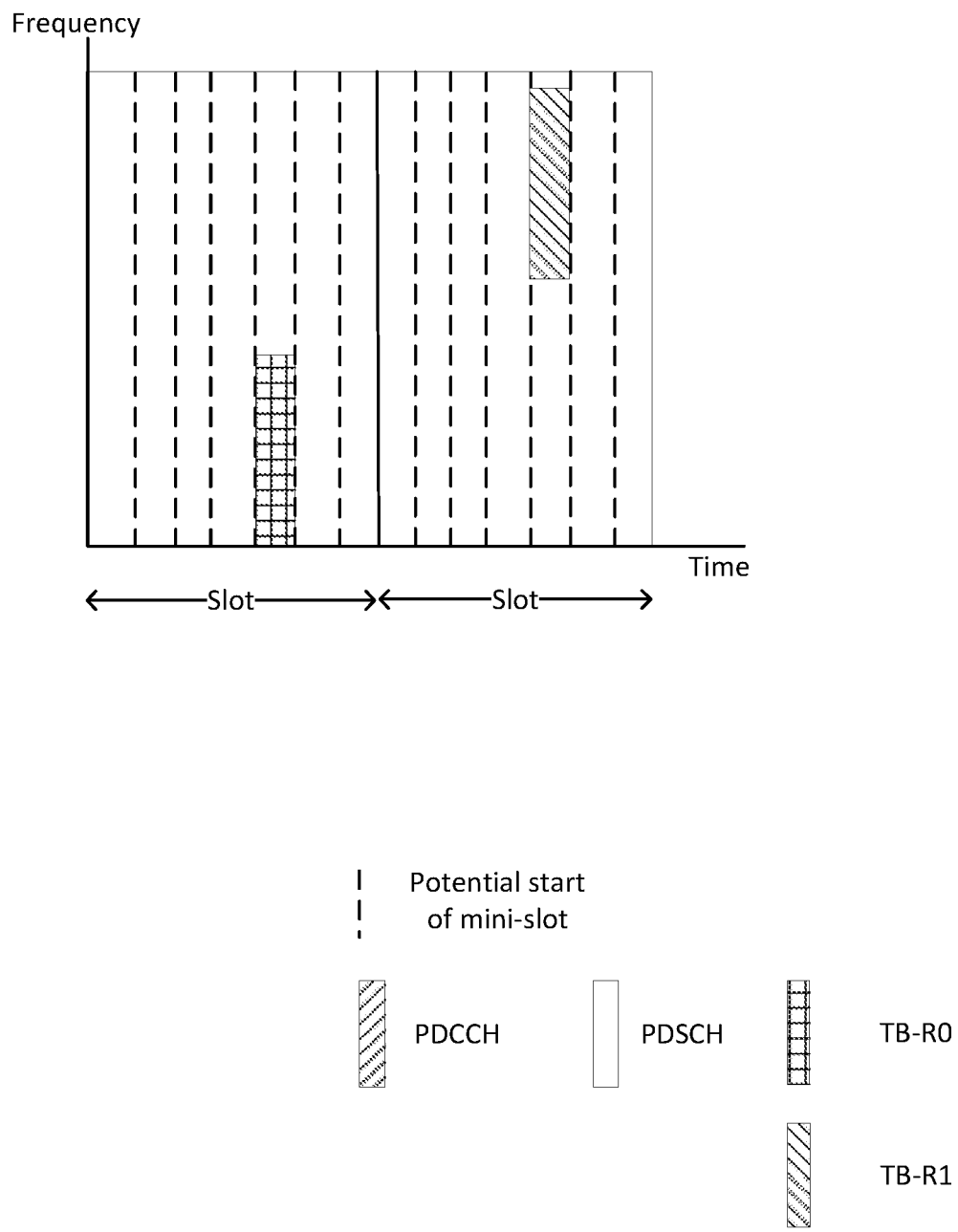

FIG. 8 shows the case of repetition of TB through transmission of multiple mini-slots which are scheduled in different slots. In FIG. 8(a), the TB is repeated twice through two mini-slots where the repetition is on the same frequency resources in different slots, and in FIG. 8(b) different frequency resources are utilized in each slot. As with previous discussion, the gNB may select a particular frequency for transmission which it knows has good performance (as in FIG. 8(a)) for a particular user, or different frequencies may be utilized to take advantage of frequency diversity (FIG. 8(b)). The gNB can select and appropriate repetition mechanism depending on knowledge and system performance.

Figure 9:
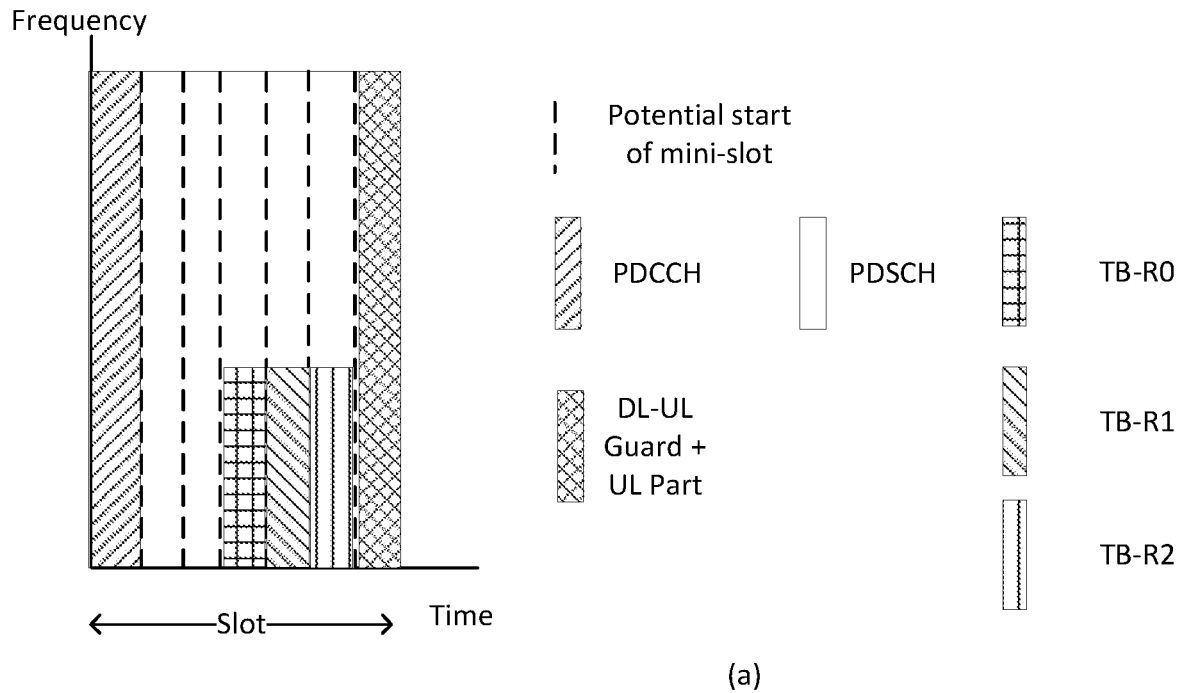
FIG. 9 shows bundling of min-slots in a self-contained frame structure.
Figure 9:
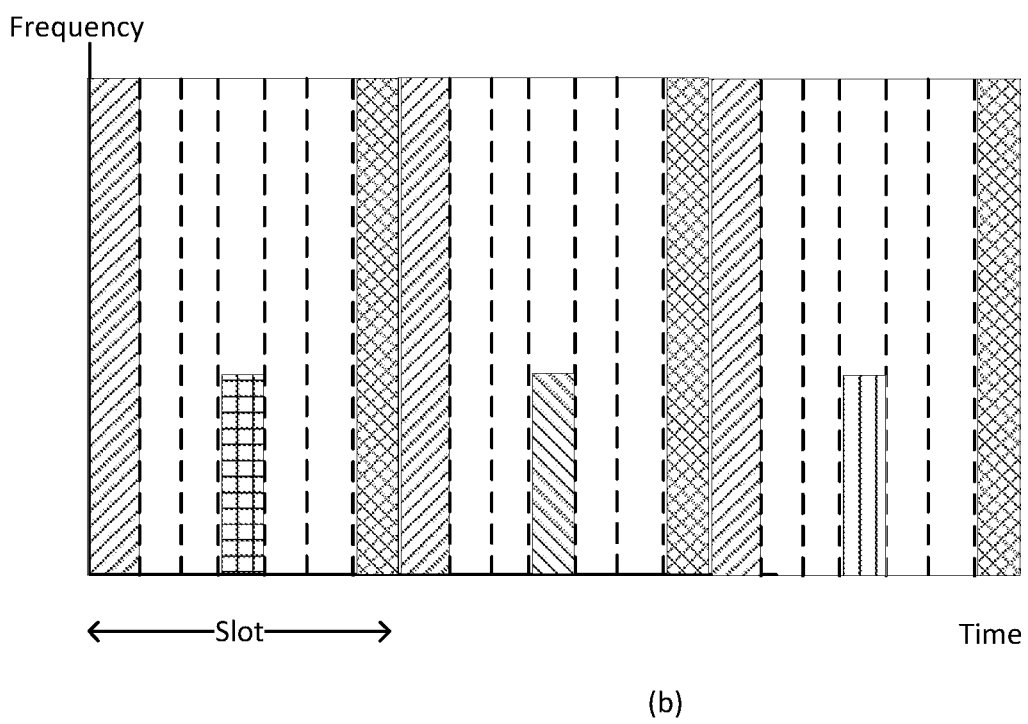

FIG. 9 shows two examples of bundling a mini-slot's original transmission (or first repetition) R0 with two additional repetitions R1 and R2 in a self-contained frame structure. The principles described in relation to this figure apply equally to other examples in this disclosure. In particular the acknowledgement processes described below apply to previous examples of bundling.

In FIG. 9(a), the repetitions have been scheduled in the same slot. This figure shows time contiguous repetitions over the same frequency resources, though different combinations of time frequency resources can be configured, for example (i) same time but different frequency, (ii) frequency hopping with time, (iii) non-contiguous in time with/without frequency hopping etc.

In FIG. 9(b), mini-slot bundling occurs over multiple slots. Although FIG. 9(b) shows the repetitions on the same time-frequency resources in the subsequent slots, they can be configured to follow a specific frequency hopping pattern to exploit frequency diversity.

Mini-slot bundling over multiple slots can be useful in containing the control overhead at the same time of achieving a certain reliability. When gNB has configured the original transmission (R0) and the two repetitions (R1 and R2) as shown in FIG. 9(b), it is not necessary to transmit all the configured repetitions once the recipient is able to decode the data from before all repetitions have been received. The gNB can configure the recipient to send a NAK in each sub-frame if decoding is not successful.

UL ACK/NAK overhead may be reduced by configuring a UE to only transmit an ACK upon successful decoding, but not to transmit a NAK if decoding fails. If decoding is not successful after the last configured repetition, the UE may transmit a NAK to inform the gNB that the TB has not been received.

To further save the UL control resource, even this last NAK can be implicit, i.e., if gNB does not receive any ACK from the UE in all sub-frames where mini-slots are scheduled, this implies a NAK.

FIG. 9 shows the case of a mini-slot which is scheduled in the slot DCI of self-contained frame structure, though the principles apply equally to mini-slot bundling scheduled in the mini-slot DCI.

Similarly bundling of mini-slots can be performed in the UL direction of self-contained frames where a DCI would configure the UL mini-slot(s). Then original transmission and repetitions are transmitted in the UL direction as per the configuration. Inter-slot UL bundling can follow the similar stopping mechanism as outlined above for DL. User can be configured to transmit each repetition until either it receives an ACK from the gNB in the DL or the configured number of repetitions have been transmitted.

In order for repeated transmissions mechanism to work correctly, gNB needs to inform the user so that it is able to receive these repetitions in the DL direction or able to transmit the repetitions in the UL direction. This may be achieved in any suitable means, but the following specific examples are provided.

Additional control information may be transmitted to indicate whether repetition is enabled, for example a single bit. The number of repetitions may be static and pre-defined, or may be cell-specific and shared by the gNB with all, or relevant, UEs in the cell. The configuration may also indicate the timing and frequency changes of repetitions subsequent to the initial transmission.

Additional control information could be a single field indicating the number of repetitions and the repetition resources can be assumed to follow a certain pattern. This pattern could be implicitly or explicitly communicated in a cell specific, group specific, service specific or UE specific manner. This pattern, for example, could indicate if repetition is contiguous, non-contiguous, intra- or inter-slot, with or without frequency hopping.

Alternatively, an index from a table of options for, for example, the number of repetitions, and time-frequency resources for repetitions with respect to the first transmission. Such a table may be pre-configured using higher-layer signalling.

All configuration information may be transmitted in the slot or mini-slot DCI as part of the L1 control information, or implicitly or explicitly configured through MAC or RRC messages.

ACK/NAK timings and resources can be configured explicitly or implicitly with the mini-slot configuration.

ACK/NAK timings and resources can be selected to follow the configuration as if no bundling was configured or they can be specifically adapted to suit the bundling configuration.

Where repetitions span more than one slot, ACK/NAK can be configured to be transmitted implicitly or explicitly upon success or only after the configured number of repetitions have been transmitted.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of downlink data transmission from a base station to a User Equipment (UE) in a cellular communication system utilizing an Orthogonal Frequency Division Multiplexing (OFDM) modulation format, the method comprising steps of:
scheduling transmission of a Transport Block of data in a first mini-slot comprising at least one OFDM symbol defined within a slot of an OFDM transmission format;
scheduling at least one repeated transmission of the Transport Block of data in at least one subsequent mini-slot comprising at least one OFDM symbol;
transmitting an indication of the scheduling from the base station to the UE; and transmitting the Transport Block as defined by the scheduling from the base station to the UE wherein a first and at least one subsequent mini-slots are located in different slots, wherein a number of repetitions is transmitted from the base station to the UE in a Radio Resource Control (RRC) message, wherein the repeated transmissions use different redundancy versions of the same Transport Block, wherein the transmission of different redundancy versions is configured by physical layer signalling, and wherein the indication of scheduling is transmitted in the first mini-slot.

2. The method according to claim 1, wherein the RRC message further indicates whether the at least one repeated transmission is the same or a different redundancy version.

3. The method according to claim 1, wherein the first and at least one subsequent mini-slots start at the same time, but utilize different frequency resources.

4. The method according to claim 1, wherein the first and at least one subsequent mini-slots start at different times.

5. The method according to claim 4, wherein the first and at least one subsequent mini-slots use the same frequency resources.

6. The method according to claim 4, wherein the first and at least one subsequent mini-slots use different frequency resources.

7. The method according to claim 1, wherein the first and at least one subsequent mini-slots are located in the same slot.

8. The method according to claim 7, wherein the indication of scheduling is transmitted in a DCI message on the PDCCH transmitted in the first mini-slot.

9. The method according to claim 1, wherein the indication of scheduling is transmitted in a DCI message on a PDCCH of a slot.

10. The method according to claim 1, wherein the UE is configured to transmit an ACK signal if a mini-slot is successfully decoded, and wherein the base station does not transmit further scheduled repetitions of that mini-slot after receipt of the ACK.

11. The method according to claim 1, wherein the UE is configured to only transmit a NAK signal if a mini-slot has not been successfully decoded after all repetitions of that mini-slot have been received.

12. A method of uplink data transmission from a UE to a base station in a cellular communication system utilizing an Orthogonal Frequency Division Multiplexing (OFDM) modulation format, the method comprising the steps of:
scheduling transmission in accordance with available resources of a Transport Block of data in a first mini-slot comprising at least one OFDM symbol defined within a slot of an OFDM transmission format;
scheduling at least one repeated transmission in accordance with available resources of the Transport Block of data in at least one subsequent mini-slot comprising at least one OFDM Symbol; and
transmitting the Transport Block as defined by the scheduling from the UE to the base station;
wherein the repeated transmissions use different redundancy versions of the same Transport Block, wherein the transmission of different redundancy versions is configured by physical layer signalling, and wherein the indication of scheduling is transmitted in a DCI message on a PDCCH of the slot in which at least the first mini-slot is located.

13. The method according to claim 12, wherein a number of repetitions is transmitted from the base station to the UE in a Radio Resource Control (RRC) message.

14. The method according to claim 12, wherein the RRC message further indicates whether the at least one repeated transmission is the same or different redundancy version.

15. The method according to claim 14, wherein the first and at least one subsequent mini-slots use the same frequency resources.

16. The method according to claim 12, wherein the first and at least one subsequent mini-slots start at different times.

17. The method according to claim 12, wherein the first and at least one subsequent mini-slots are located in different slots.

* * * * *